May 20, 1952   T. W. BARNES   2,597,280
POWER-OPERATED UNIVERSAL CHUCK
Filed Aug. 26, 1949   4 Sheets-Sheet 1

Tracy W. Barnes,
Inventor.
Haynes and Koenig
Attorneys.

May 20, 1952     T. W. BARNES     2,597,280
POWER-OPERATED UNIVERSAL CHUCK
Filed Aug. 26, 1949     4 Sheets—Sheet 2

May 20, 1952 T. W. BARNES 2,597,280
POWER-OPERATED UNIVERSAL CHUCK
Filed Aug. 26, 1949 4 Sheets-Sheet 3
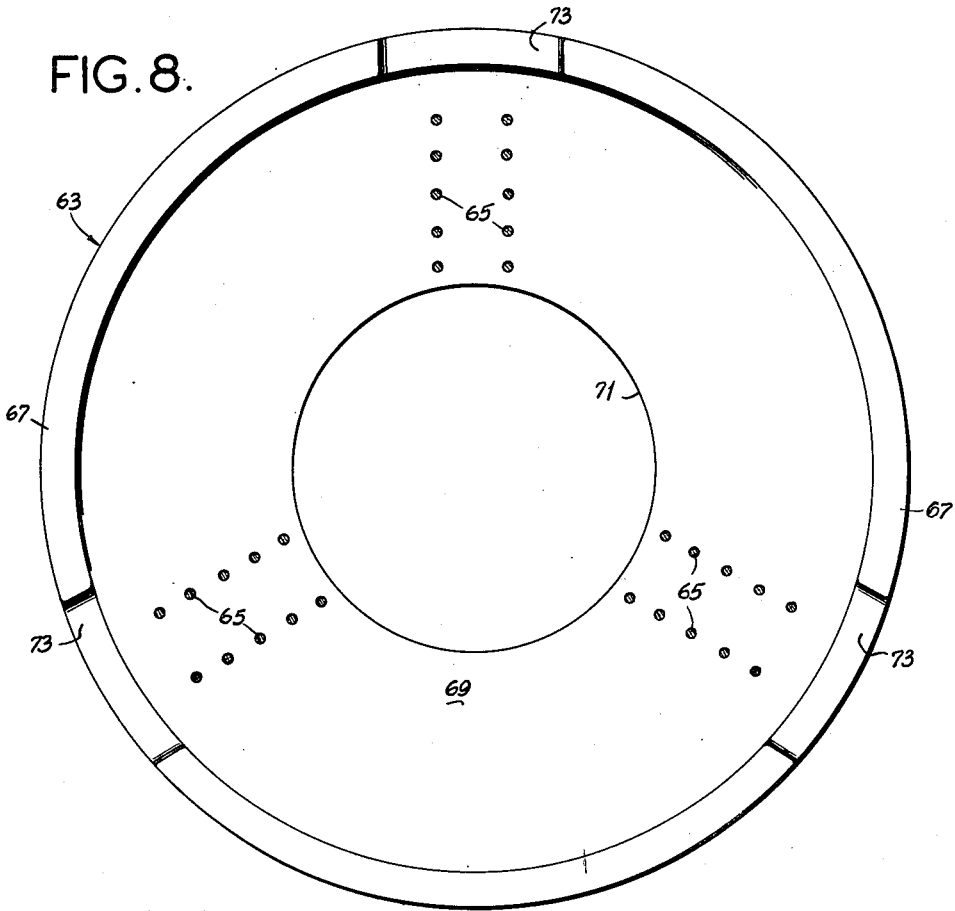
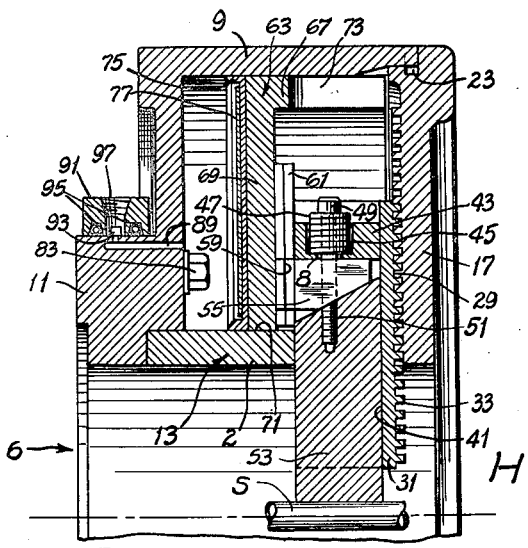

May 20, 1952     T. W. BARNES     2,597,280
POWER-OPERATED UNIVERSAL CHUCK

Filed Aug. 26, 1949     4 Sheets-Sheet 4

Tracy W. Barnes,
Inventor.
Haynes and Koenig
Attorneys.

Patented May 20, 1952

2,597,280

UNITED STATES PATENT OFFICE 2,597,280

POWER-OPERATED UNIVERSAL CHUCK

Tracy W. Barnes, Webster Groves, Mo., assignor to John Ramming Machine Company, St. Louis, Mo., a corporation of Missouri Application August 26, 1949, Serial No. 112,600

3 Claims. (Cl. 279—121)

This invention relates to universal chucks, and more particularly to power-operated chucks of this class.

The object of the invention is to provide in a chuck, particularly of the power-operated type, a compact, reliable and safe construction having jaws which are simultaneously (universally) operated both for manual diametral adjustment and for power-gripping operation at any given adjustment; the provision of a chuck of this class having no unsafe external protrusions, and wherein no central draw mechanism is employed, thus providing for a large unobstructed central opening which will accommodate a large range of sizes of objects to be gripped, such as, for example, a large range of sizes of pipe to be threaded or otherwise machined; and the provision of a chuck of the class described which may be power-operated to grip and release while rotating. Other objects will be in part apparent and in part pointed out hereinafter.

Briefly, the invention consists in an annular chuck housing having an enclosing annular rotary scroll ring. Within the chuck housing is a spider which carries a plurality (preferably three) jaw carriers which are simultaneously radially controlled by the scroll ring. These carriers support jaws which are radially adjustable with respect to the carriers, and which simultaneously may be given spring-returned radial movements with respect thereto, to provide a gripping action at any given adjustment of the carriers by the scroll ring. The gripping action is provided for by a plurality of wedges which are axially movable in any radial position which they are permitted to assume as the carriers are moved. The wedges have radial sliding connections with an axially movable piston so that they may be driven to wedging and unwedging positions in any radially adjusted positions of the assemblies of jaw carriers and jaws. The piston is also spring-returnable to release position. Fluid (preferably air) for operating the piston is introduced and exhausted through a stationary distributor ring associated with the chuck housing, the latter interiorly constituting the cylinder for the piston, and by this means chucking operations may be carried out while the chuck is rotating.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a side elevation on a reduced scale of a chuck embodying the invention;

Fig. 8 is an end view of an operating piston per se as viewed from the right of Fig. 3; and Figs. 9, 10 and 11 are views similar to certain upper wedging parts of Fig. 3 illustrating various operating positions of parts.

Similar reference characters indicate corresponding parts throughout the several views of the drawings.

Figure 3:
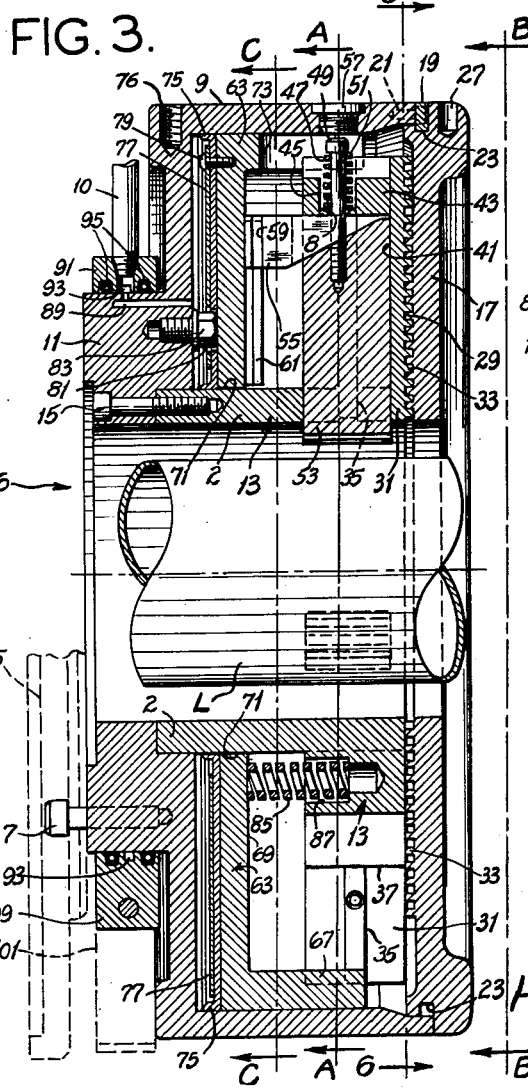
Fig. 3 is a median section on a larger scale, taken on line 3—3 of Fig. 2.

Referring now more particularly to the drawings, there is shown at numeral 1 the headstock of a typical machine tool to which the chuck is applied, which includes a rotary member 3. At 5 is shown an adaptor plate by means of which the chuck of the present invention is mounted (see fasteners 7 in Fig. 3). At numeral 9 is shown a cup-shaped chuck housing having a hub 11. A central spider 13 is attached to the interior of the hub 11 by fasteners 15 (Fig. 3). A part of this spider is constituted by an inner sleeve 2 which inwardly defines an extension of the opening within the hub 11. The end of this sleeve 2 carries lugs 37 defining radial guide passages 39 which will be described below.

Figure 4:
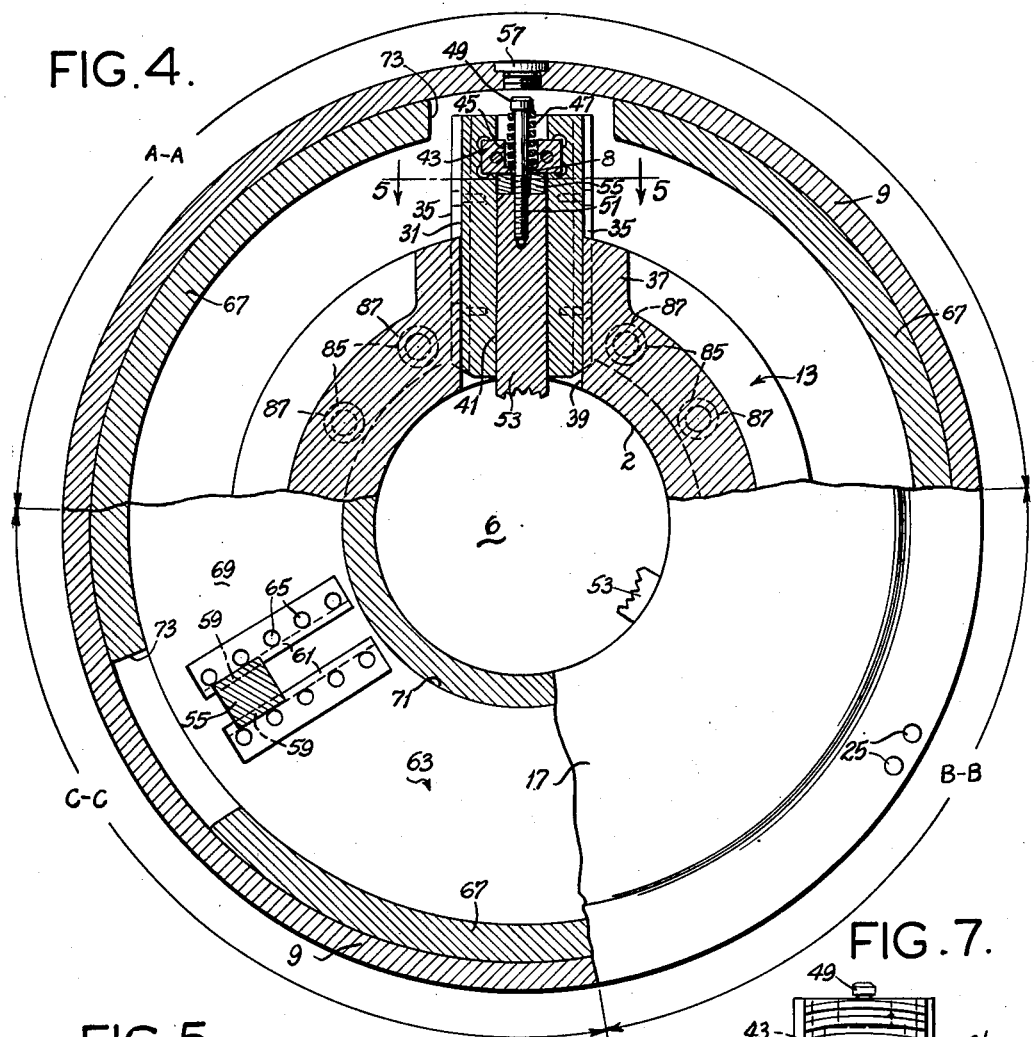
Fig. 4 is a sectional view, the upper half of which is taken in the plane A—A of Fig. 3, the lower right-hand quadrant of which is taken in the plane B—B of Fig. 3, and the lower left quadrant of which is taken in the plane C—C of Fig. 3.
Figure 6:
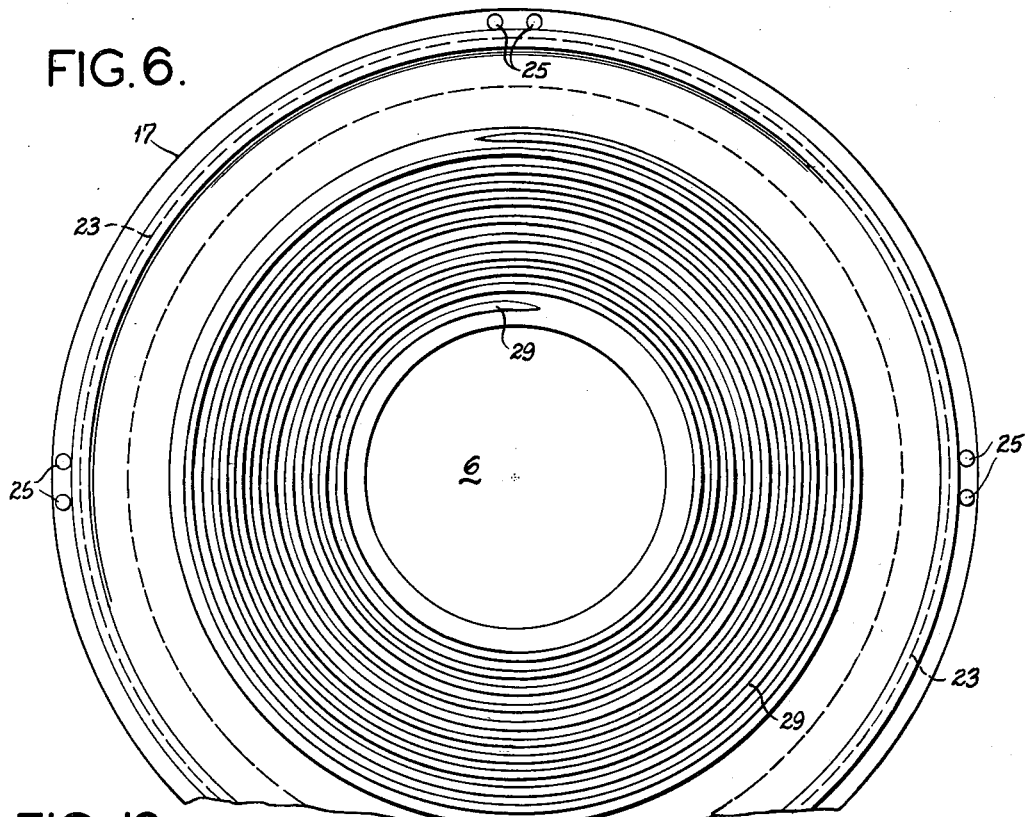
Fig. 6 is a cross section taken on line 6—6 of Fig. 3.

Covering the front of the housing 9 (except at the central portion) is a rotary annular scroll, cam ring or plate 17 (Figs. 3, 4 and 6). This plate has a hole through it coaxial with the hole within hub 11 and sleeve 2. The result is a continuous hollow central cylinder 6 of generous diameter, providing a large amount of unobstructed central space for the reception of large workpieces. Rotary attachment to housing 9 of scroll 17 is accomplished by keys 19 which are fastened at intervals to the front end of the housing 9 by screws 21, the keys engaging in a groove 23 cut into the ring 17 (Fig. 3). Openings 25 in the ring 17 provide access to the screws (Fig. 4). The periphery of the ring 17 is also provided with holes 27 for the reception of a suitable lever bar for turning the ring into any desired angular position on the housing 9. The inside face of the ring 17 is provided with a spiral or scroll thread or cam 29 (Fig. 6).

Figure 5:
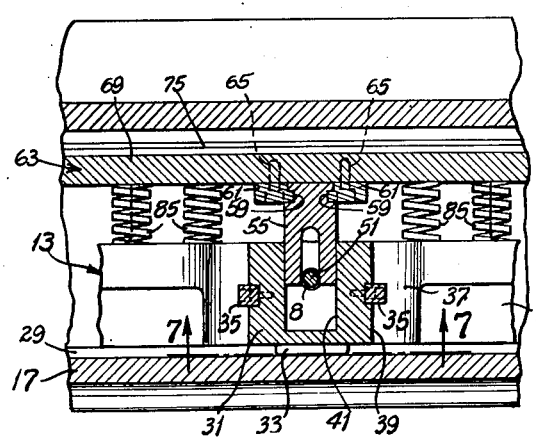
Fig. 5 is a horizontal section taken on line 5—5 of Fig. 4, being enlarged.
Figure 7:
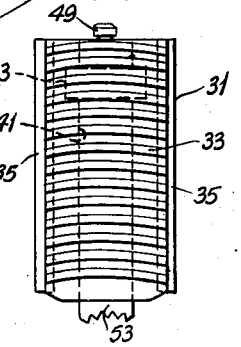
Fig. 7 is a cross section taken on line 7—7 of Fig. 5.

Behind the scroll ring 17 are three jaw carriers 31 (for a detail see Fig. 7) which have segmental threads 33 engaging the scroll thread 29. These carriers 31 are radially slidable in slots 39 of the lugs 37 in the spider 13. Each carrier is channel-shaped (Fig. 5) and includes attached lateral keys 35 which slide in sidewise radial grooves in the slots 39. The channel 41 of each carrier 31 is blocked off at the top by means of an inserted thrust block 43. The thrust block 43 is preferably a changeable insert in the jaw carrier 31, instead of integral as it might be, for convenience in providing a special (and renewable) hard surface at the point of thrust.

On the top of each block is a spring socket 45 for a compression spring 47 which reacts from the socket against the head 49 of a bolt 51. Each bolt slides through a hole 8 in the bottom of the socket 45 and is threaded into a gripper jaw 53. Each jaw 53 slides in the respective channel 41 of its carrier 31. The bottom of each thrust block 43 and the top of each jaw 53 are relatively angled for the reception of a forked wedge 55. The fork shape of the wedge is to accommodate motion relative the bolt 51. Each bolt 51 is accessible for adjusting its spring 47 through a threaded access plug 57.

The rear end of each fork 55 is provided with grooves 59 for sliding engagement within pairs of parallel dovetail bars 61 (Figs. 3 and 5) held in spaced radial positions on the front of a piston 63 (see also Fig. 8). The bars 61 are held in place by screws 65.

The form of the piston 63 is best shown in Fig. 8. It is cup-shaped, having a rim 67 and a bottom 69 wherein is an opening 71, the latter for surrounding the central cylindric portion 2 of the spider 13. In the rim 67 are castellations 73, for clearing the jaw carriers when the latter are in their outermost positions. On the face of the piston is carried a packing ring 75, which has peripheral sealing lips with the inside cylindric surface of the housing 9 and the outside cylindric surface of 2. The packing ring 75 is held in position by a plate 77, held down by screws 79. The packing includes openings 81 for permitting the face of the piston 63 to contact stops 83 threaded into the hub 11, which limits retractive movement of the piston 63. Retractive spring-return is provided by springs 85, reacting from spring seats 87 in the spider 13 (Fig. 3).

In order to bring operating fluid (in the present case air) to the piston 63, the hub 11 is ported as shown at 89 (Fig. 3). Around the hub is carried a distributor ring 91 which is centrally grooved as shown at 93. On each side of the groove 93 are packing rings 95. The groove 93 is provided with an inlet tap 97 for accepting an air pipe 10 (see Fig. 1) in which are suitable control auxiliaries such as a three-way inlet and exhaust valve, filter, pressure regulator and lubricator (not shown). Since air and fluid line auxiliaries of this type are well-known, no further description or showing is needed for those skilled in the art. The purpose of the distributor ring 91 is to allow for introduction and release of air to and from the space behind the piston in any angular position of the chuck, although the distributor ring is stationary. At numeral 99 is shown an extension on the ring for cooperation with a holding dog 101 fastened to the bed of the machine which carries the chuck. This holds the ring stationary while the hub 11 revolves in it.

Figure 1:
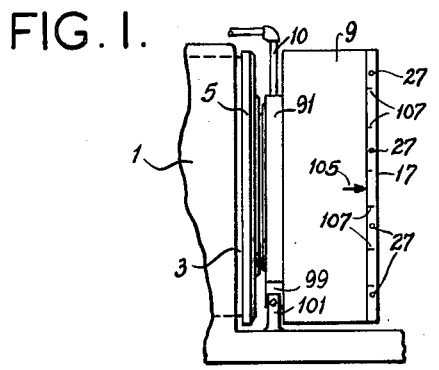
Figure 2:
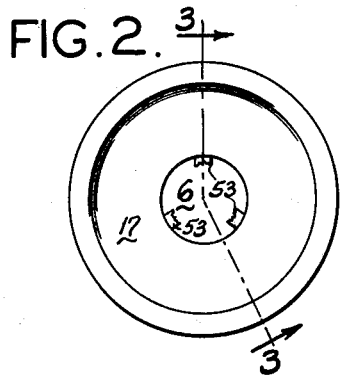
Fig. 2 is an end elevation, viewed from the right of Fig. 1.

Operation is as follows:

The chuck is mounted on the rotary member 3 by means of the adaptor 5, the distributor ring 91 being held against rotation by the dog 101, and the remaining parts of the chuck being rotary as a unit. The member to be chucked, which may be of considerable size because of the large central opening provided at 6, is introduced into or through said opening. This is done after the scroll ring 17 has been adjusted by use of a bar in one of the openings 27, so that the jaw carriers 31 and attached jaws 53 are clear. In practice, suitable index characters 107 are placed on an outer periphery of the ring 17 with a pointer index mark 105 on the outside of the chuck housing 9, to indicate the maximum diameter of work that will be accepted at a given adjustment (Fig. 1).

Next the air may be turned on, which admits pressure behind the piston 63, forcing it forward. This drives the wedges 55 forward (to the right) between the thrust block 43 and the upper outer ends of the jaws. This wedges the jaws inward to grip the work. After the desired rotary operation has been performed on the work, the air is released, whereupon the springs 85 return the piston 63 to withdraw the wedges 55. The springs 47 then retract the jaws outward to release the work. The power-gripping and releasing operations may be performed either while the chuck is stationary or rotating.

Figs. 3, 10, 9 and 11 illustrate certain advantages of the invention. By comparing Figs. 3 and 9, it will be seen how, when the air is turned off (piston 63 retracted), the scroll ring 17 may be rotated so that each entire assembly of jaw carrier 31, jaw 53 and wedge 55 is carried in or out, the sliding dovetail connection between each jaw assembly and the piston maintaining the driving connection with the piston under any radially adjusted condition. In Fig. 3 is shown a maximum outward adjustment for large work L, and in Fig. 9 a maximum inward one for small work S. This adjustment must be made while the chuck housing 9 is stationary or nearly so.

Figure 9:
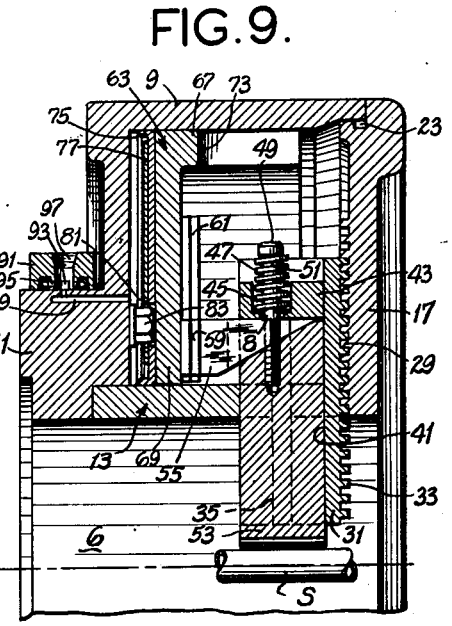
Figure 10:
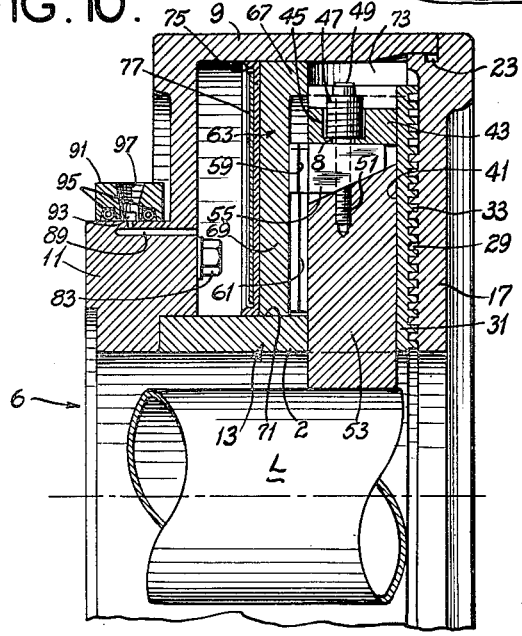

Figs. 3, 9, 10 and 11 demonstrate how with respect to any size of workpiece the jaws are moved from a non-clamping or radially retracted position (such as shown in Figs. 3 and 9) to the clamping position shown in said Figs. 10 and 11, respectively. This involves turning on the air to push the piston forward. The range of work accommodated is clear from these figures. It will be understood that in the case where these workpieces are long, the rotary parts in the headstock 1 which support the chuck are hollow, so that they may, as usual, be fed through the headstock from the rear into the chuck.

It will be observed that the cooperation between the threads 29 of the scroll ring and the segmental threads 33 on the jaw carriers 31 are in effect camming means between these pieces and it will be understood that other simultaneously operating cam means may be used between a member such as 17 and the jaw carrier within the scope of the invention, and the term scroll comprehends these.

A feature of the invention which is clear from

Fig. 1 is the absence from the outside of the housing 9 or scroll ring 17 of any protruding adjusting elements. This contributes substantially to the safety of operation of the device.

By having the piston 69 spring-retractible and an axially interlocked connection between it and the wedges 55, the jaw-retracting springs 47 are not required to return the piston by reaction through the wedges. These springs 47 thus perform jaw-retracting functions, while the springs 85 produce piston-retractive functions. This separation of the retractive functions of the two sets of springs ensures a reliable retractive operation on all parts. Contributing to this feature is the fact that the wedges 55 have the axially interlocked, radially slidable dovetail connection with the piston which has the additional function of allowing the piston to withdraw the wedges upon retraction and allowing the wedges to move with the jaw and jaw carrier assemblies upon rotating the scroll ring without binding at sliding connections between the wedges and the piston.

It will be observed in connection with Figs. 3, and 9–11, that the following auxiliary devices on the periphery of the chuck shown on Fig. 3 have not been repeated in the rim section of Figs. 9–11, inasmuch as the latter are designed primarily to show alternate positions of the primary elements of the chuck, i. e., a threaded socket 76, provided for a lifting eye, the access plug 57, key 19 and its fastener 21, and the hole 27.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A chuck comprising a support, jaw carriers carried by and guided for radial movement relative to the support, jaws carried by and guided for radial movement relative to the jaw carriers, wedges carried by and guided for axial movement relative to the jaw carriers, and a wedge driving member carried by and guided for axial movement relative to the support, axial movement of the wedge driving member causing simultaneous axial movement of all wedges, said wedges having radial sliding connections with the wedge driving member and being movable between the jaw carriers and jaws to cause inward radial movements of the jaws.

2. A chuck as set forth in claim 1, wherein the radial sliding connections between the wedges and the wedge driving member are adapted both to advance and retract the wedges upon axial movement in opposite directions of the wedge driving member, and spring means between the jaw carriers and the jaws adapted to bias the jaws outward relative to the carriers.

3. A chuck set forth in claim 1, wherein the radial sliding connections between the wedges and the wedge driving member are adapted both to advance and retract the wedges upon axial movement in opposite directions of the wedge driving member, wherein spring means are employed between the jaw carriers and the jaws adapted to bias the jaws outward relative to the carriers, and wherein the wedge driving member is power-driven in a direction to force the wedges between the jaw carriers and jaws but spring-returned to retract said wedges.

TRACY W. BARNES.

REFERENCES CITED

The following references are of record in the file of this patent:

UNITED STATES PATENTS

| Number | Name | Date |
|---|---|---|
| 1,364,783 | Morgan | Jan. 4, 1921 |
| 1,469,360 | Cullen | Oct. 2, 1923 |
| 1,608,462 | Cutler | Nov. 23, 1926 |
| 2,191,371 | Church | Feb. 20, 1940 |
| 2,474,771 | Amstutz et al. | June 28, 1949 |